(12) United States Patent
Izumi et al.

(10) Patent No.: US 12,448,915 B2
(45) Date of Patent: Oct. 21, 2025

(54) ENGINE

(71) Applicant: KAWASAKI MOTORS, LTD., Hyogo (JP)

(72) Inventors: Kyohei Izumi, Hyogo (JP); Yuji Hida, Hyogo (JP); Jun Takagi, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/603,814

(22) Filed: Mar. 13, 2024

(65) Prior Publication Data

US 2024/0309802 A1  Sep. 19, 2024

(30) Foreign Application Priority Data

Mar. 14, 2023 (JP) ................................ 2023-039656
Oct. 18, 2023 (JP) ................................ 2023-179752

(51) Int. Cl.
*F02B 75/20* (2006.01)
*F02B 33/22* (2006.01)

(52) U.S. Cl.
CPC .............. *F02B 75/20* (2013.01); *F02B 33/22* (2013.01)

(58) Field of Classification Search
CPC .................................. F02B 75/20; F02B 33/22
See application file for complete search history.

(56) References Cited

U.S. PATENT DOCUMENTS

| | | | |
|---|---|---|---|
| 7,140,934 B2 | 11/2006 | Hoi | |
| 8,905,181 B2 | 12/2014 | Yokota | |
| 11,732,634 B1* | 8/2023 | Toriizuka | F01P 1/02 |
| | | | 123/41.56 |
| 2005/0236192 A1* | 10/2005 | Hoi | F01M 1/12 |
| | | | 123/196 R |
| 2006/0068656 A1 | 3/2006 | Hoi | |
| 2014/0083789 A1 | 3/2014 | Yokota | |

FOREIGN PATENT DOCUMENTS

| | | |
|---|---|---|
| CA | 2437464 | 2/2004 |
| JP | 2006-97564 | 4/2006 |
| JP | 2014-065465 | 4/2014 |

* cited by examiner

*Primary Examiner* — Kevin A Lathers
(74) *Attorney, Agent, or Firm* — Greenblum & Bernstein, P.L.C.

(57) ABSTRACT

An engine includes a starter motor and a filter, both of which are positioned to a side of a cylinder that faces an exhaust port with respect to a direction that is perpendicular to both a reciprocating direction of a piston and an axial direction of a crankshaft. Moreover, the starter motor is positioned to a side of the cylinder that faces a crankcase, and the filter is positioned to a side of the starter motor that faces a cylinder head, with respect to the reciprocating direction of the piston.

13 Claims, 5 Drawing Sheets

VD ↕
PD ↔

EXHAUST PORT SIDE
(OTHER END SIDE)

INTAKE PORT SIDE
(ONE END SIDE)

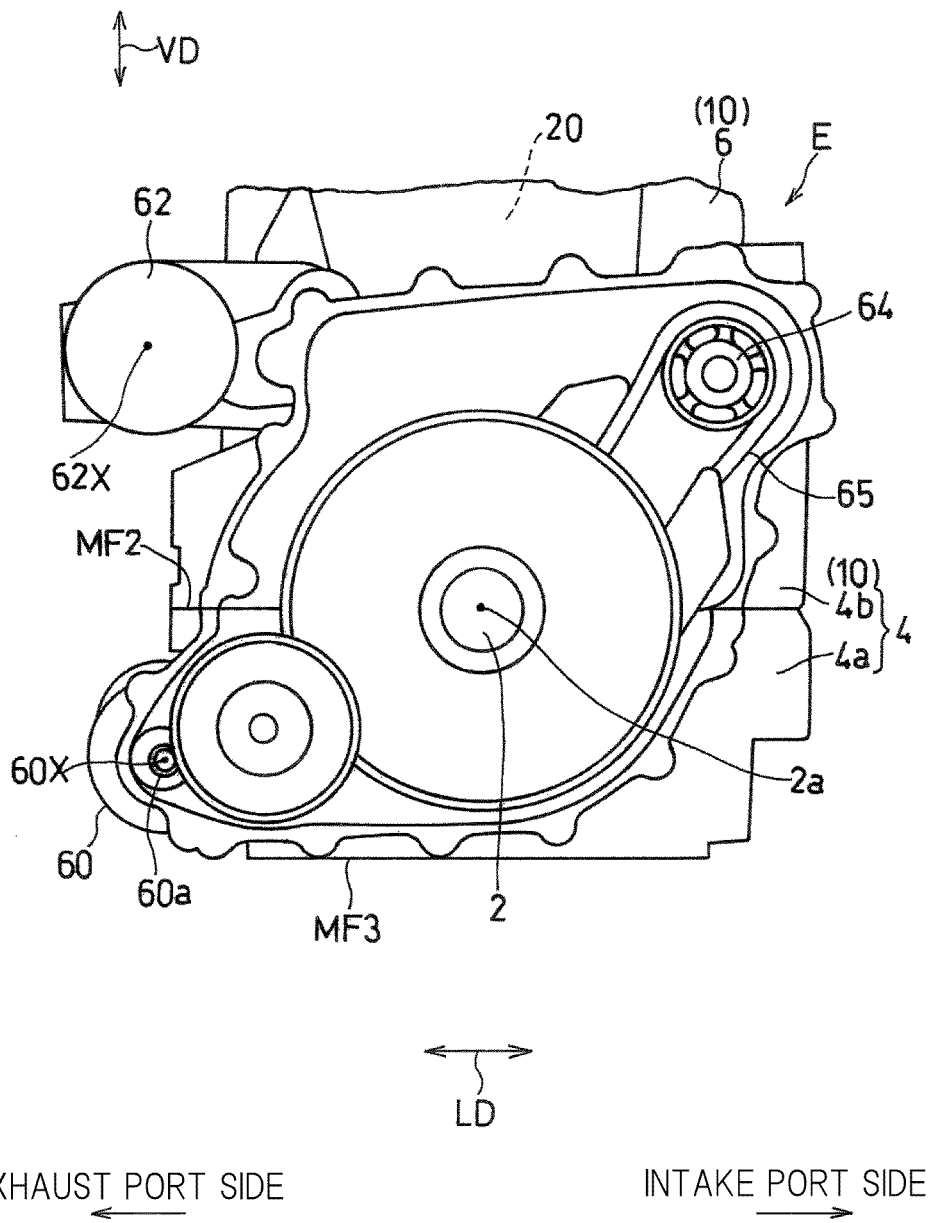

ENGINE

CROSS REFERENCE TO THE RELATED APPLICATION

This application is based on and claims Convention priority to Japanese patent applications No. 2023-039656, filed Mar. 14, 2023 and No. 2023-179752, filed Oct. 18, 2023, the entire disclosures of which are herein incorporated by reference as a part of this application.

BACKGROUND OF THE INVENTION

Field of the Invention

The present disclosure relates, for example, to an engine that is used as a power source for a vehicle.

Description of Related Art

Vehicles such as motorcycles often employ an engine as a power source (for example, JP 2014-065465 A). The engine of JP 2014-065465 A includes a crankcase, the front side of which has an oil filter arranged on a lower part of the crankcase and a starter motor arranged on an upper part of the crankcase. It is thereby possible for the oil filter and the starter motor to be arranged in an overlapping manner as seen in a top view, thus, allowing the engine to be constructed in a compact manner in a widthwise direction thereof.

In the engine of JP 2014-065465 A, however, the starter motor is positioned in close proximity to an exhaust port of the engine. Therefore, there is a concern that the starter motor may be affected by the heat of the exhaust gas.

SUMMARY OF THE INVENTION

The present disclosure provides an engine which can keep a starter motor from being thermally affected while also being compact.

An engine, according to a first aspect of the present disclosure, includes a piston, a crankshaft which converts a reciprocal motion of the piston to produce a rotary motion, a crankcase supporting the crankshaft, a cylinder extending from the crankcase to protrude in a reciprocating direction of the piston, a cylinder head coupled to a protruding end of the cylinder, a starter motor which rotates the crankshaft to initiate an operation of the engine, and a filter which filters a lubricant fluid circulating through the engine. The engine also includes an air intake port and an exhaust port defined in one and the other of opposite sides of the cylinder head, respectively, in a direction perpendicular to both a reciprocating direction of the piston and an axial direction of the crankshaft. The starter motor and the filter are positioned to a side of the cylinder that faces the exhaust port with respect to the perpendicular direction. Further, the starter motor is positioned to a side of the cylinder that faces the crankcase, and the filter is positioned to a side of the starter motor that faces the cylinder head, with respect to the reciprocating direction for the piston.

In an engine according to the present disclosure, the starter motor and the filter are arranged spaced apart in the reciprocating direction of the piston. This allows the starter motor and the filter to be arranged in an overlapping manner when viewed in the reciprocating direction of the piston, thereby making it possible for the engine to be reduced in size in the axial direction of the crankshaft or in a widthwise direction of the engine. Further, the starter motor is positioned to a side of the cylinder that faces the crankcase with respect to the reciprocating direction of the piston, and the filter is positioned to a side of the starter motor that faces the cylinder head. This allows the starter motor to be arranged distant from the exhaust port of the engine. In this way, the starter motor can be kept from being affected by the heat of exhaust gas.

Any combinations of at least two features disclosed in the claims and/or the specification and/or the drawings should also be construed as encompassed by the present disclosure. Especially, any combinations of two or more of the claims should also be construed as encompassed by the present disclosure.

BRIEF DESCRIPTION OF THE DRAWINGS

The present disclosure will be more clearly understood from the following description of preferred embodiments made by referring to the accompanying drawings. However, the embodiments and the drawings are given merely for the purpose of illustration and explanation, and should not be used to delimit the scope of the present disclosure, which scope is to be delimited by the appended claims. In the accompanying drawings, alike numerals are assigned to and indicate alike parts throughout the different figures, and:

FIG. 5 shows a side view of the right of the engine with a generator cover removed.

DESCRIPTION OF EMBODIMENTS

Figure 1:
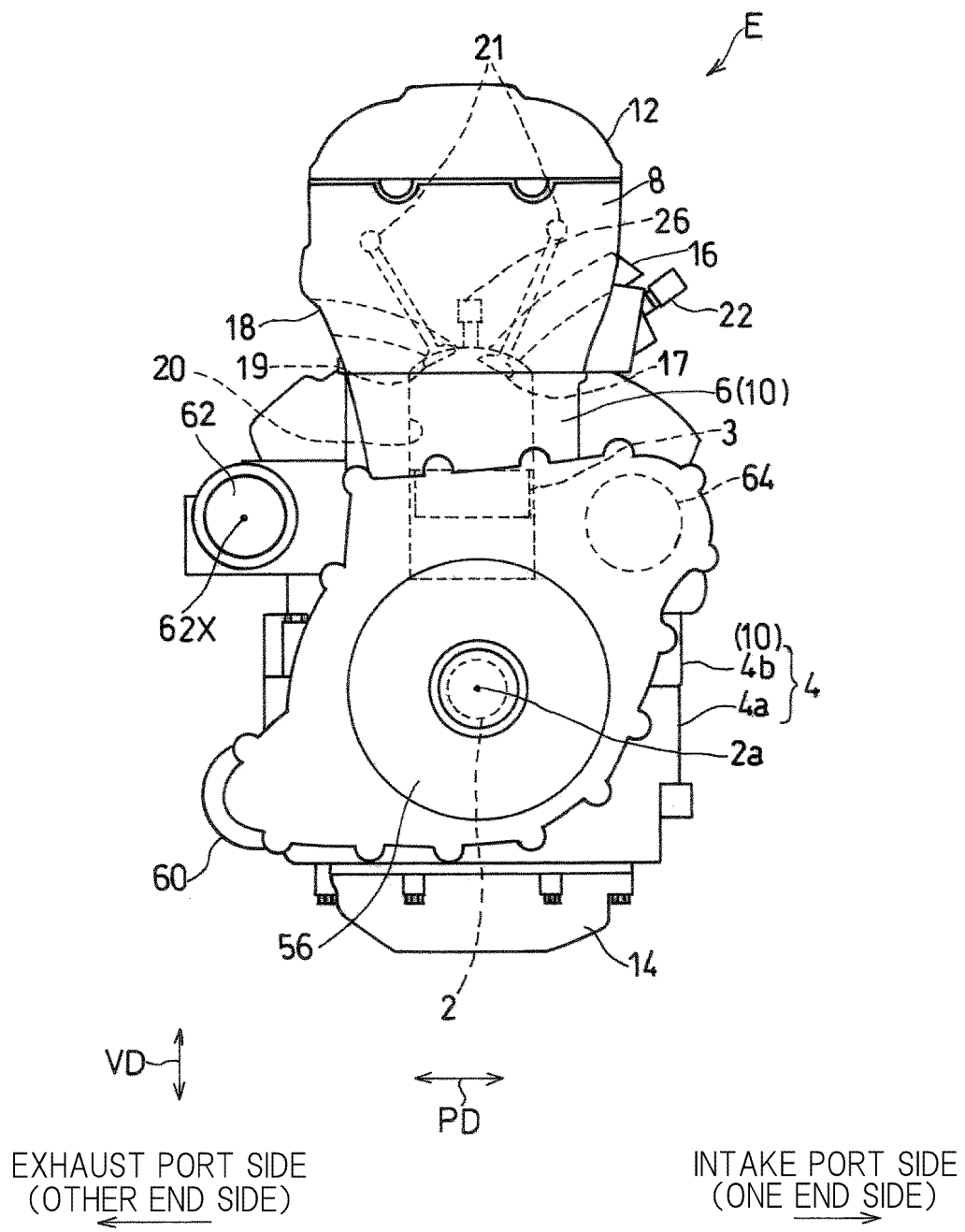
FIG. 1 shows a side view of the right of an engine in accordance with a first embodiment of the present disclosure.

What follows is a description of preferred embodiments of the present disclosure made with reference to FIGS. 1 to 5. An engine E in the instant embodiment is a reciprocating engine and is used, for example, in an aircraft having a fuselage and a propeller disposed on a leading end of the fuselage. The engine E in this case is received within the fuselage and produces power to be transferred to the propeller. This is merely one of the non-limiting examples of the use of the engine E; for instance, the engine E can also be used as a power source for a ship. The engine E can also be used as a power source for wheeled vehicles including two-wheeled and four-wheeled vehicles.

In the discussions that follow, the term "widthwise direction WD" refers to a direction in or along which a crankshaft 2 of the engine E extends. With respect to the widthwise direction WD, a "widthwise inside" refers to a side facing towards a center of the engine E in the widthwise direction, whereas a "widthwise outside" refers to a side facing away from the center of the engine E in the widthwise direction. The term "reciprocating direction VD" refers to a direction in or along which pistons of the engine E reciprocate. The term "perpendicular direction PD" refers to a direction perpendicular to both the "widthwise direction WD" and the "reciprocating direction VD."

The engine E in the instant embodiment is a six-cylinder engine having six cylinders arranged along a direction in which the crankshaft 2 extends. It should be understood that the number of the cylinders is not so limited; for example, the number of the cylinders may be four. Further, while the engine E in the instant embodiment is a gasoline engine, gasoline is only one of the non-limiting examples of fuel. The crankshaft 2 converts reciprocal motions of the pistons 3 to produce a rotary motion.

The engine E includes a crankcase 4 supporting the crankshaft 2, the cylinders 6 extending from the crankcase 4 so as to protrude on one side thereof in the reciprocating direction VD, and a cylinder head 8 coupled to protruding ends of the cylinders 6. In the discussions that follow, with respect to the reciprocating direction VD, the terms "upper" and "upward" refer to a side on which the cylinders 6 protrude from the crankcase 4, whereas the terms "lower" and "downward" refer to a side opposite thereto.

The crankcase 4 is formed of two upper and lower sub-parts including a lower crankcase 4a and an upper crankcase 4b. In the instant embodiment, the upper crankcase 4b and the cylinders 6 are formed as one piece by being cast in a die. However, the upper crankcase 4b and the cylinders 6 may alternatively be independent units. In the discussions that follow, the one-piece unit including the upper crankcase 4b and the cylinders 6 will be referred to as a cylinder block 10.

The engine E also includes a head cover 12 coupled to an upper end of the cylinder head 8 and an oil pan 14 coupled to a lower end of the crankcase 4. The cylinder head 8 and the cylinder head cover 12 define a cam chamber. The oil pan 14 serves as a reservoir of engine oil which represents an engine lubricant fluid.

The cylinder head 8 has an air intake port 16 and an exhaust port 18 which are open to one side (i.e., the right side of FIG. 1) and the other end side (i.e., the left side of FIG. 1), respectively, of the cylinder head 8 in the perpendicular direction PD. In the discussions that follow, the terms "air intake port-side" and "exhaust port-side" simply refer to a side of the engine E where the air intake port is located and a side of the engine E where the exhaust port is located in the perpendicular direction PD, respectively.

The air intake port 16 and the exhaust port 18 represent passages defined inside the cylinder head 8. An upstream end of the air intake port 16 is open to one of the opposite sides of the cylinder head 8 in the perpendicular direction PD, whereas a downstream end of the air intake port 16 is open to a corresponding one of combustion chambers 20 within the cylinders 6. An upstream end of the exhaust port 18 is open to a corresponding one of the combustion chambers 20 within the cylinders 6, whereas a downstream end of the exhaust port 18 is open forwards to the other of the opposite sides of the cylinder head 8 in the perpendicular direction PD. The air intake port 16 is formed for each of the cylinders. Likewise, the exhaust port 18 is formed for each of the cylinders.

Ambient air is delivered via the air intake port 16 as intake air to a corresponding combustion chamber 20. Concurrently, the fuel is injected by an injector 22 into the corresponding combustion chamber 20, thereby forming an air-fuel mixture. The air-fuel mixture in the corresponding combustion chamber 20 is ignited by an ignition plug 26 for combustion. Exhaust gas from the combustion is discharged out of the engine via the exhaust port 18.

The engine E in the instant embodiment includes an air intake valve 17 which opens and closes a corresponding air intake port 16 and an exhaust valve 19 which opens and closes a corresponding exhaust port 18. A valve operation control mechanism 21 opens and closes the air intake valve 17 and the exhaust valve 19. In the instant embodiment, there are two air intake valves 17 and two exhaust valves 19 for each of the cylinders.

Figure 2:
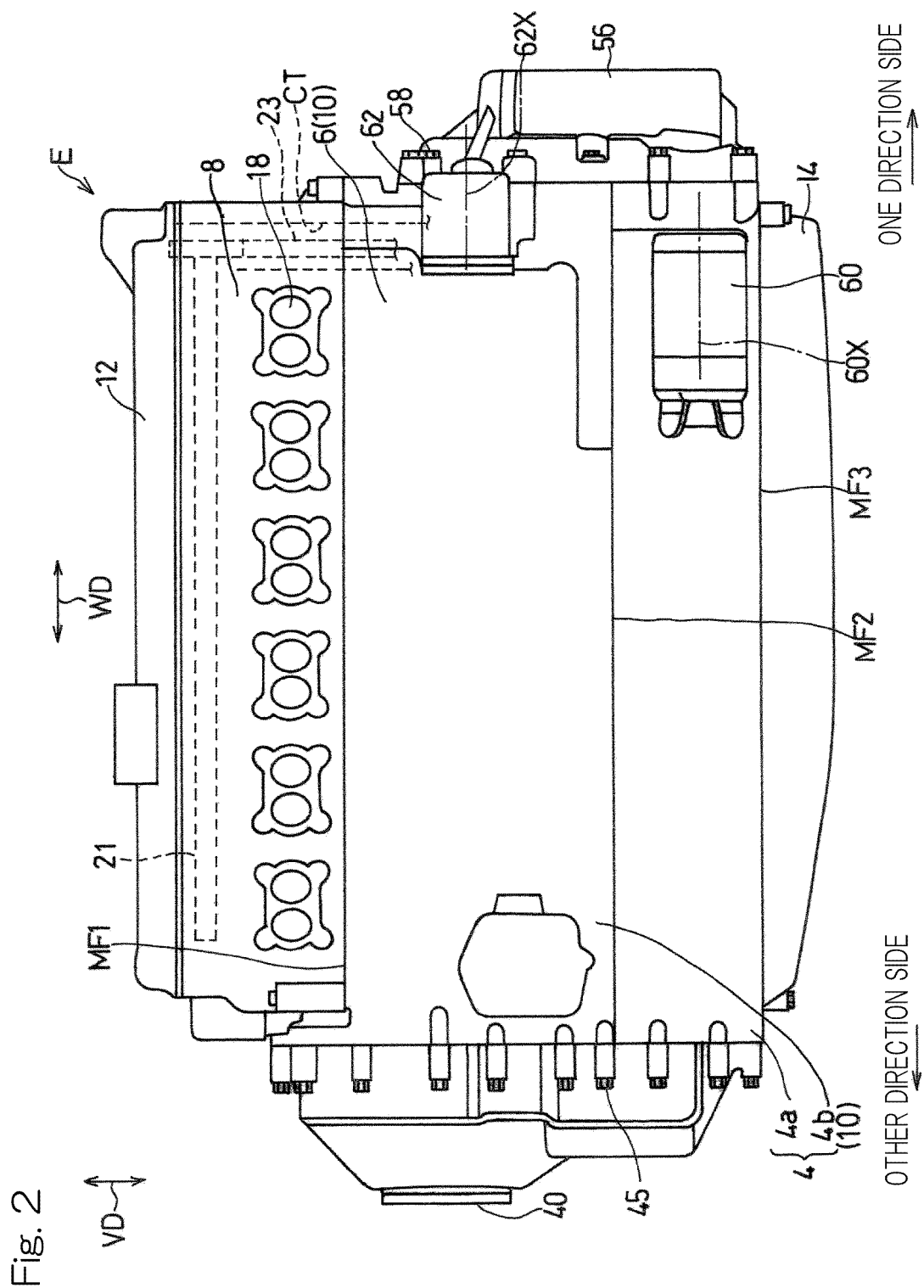
FIG. 2 shows a front elevational view of the engine.
Figure 3:
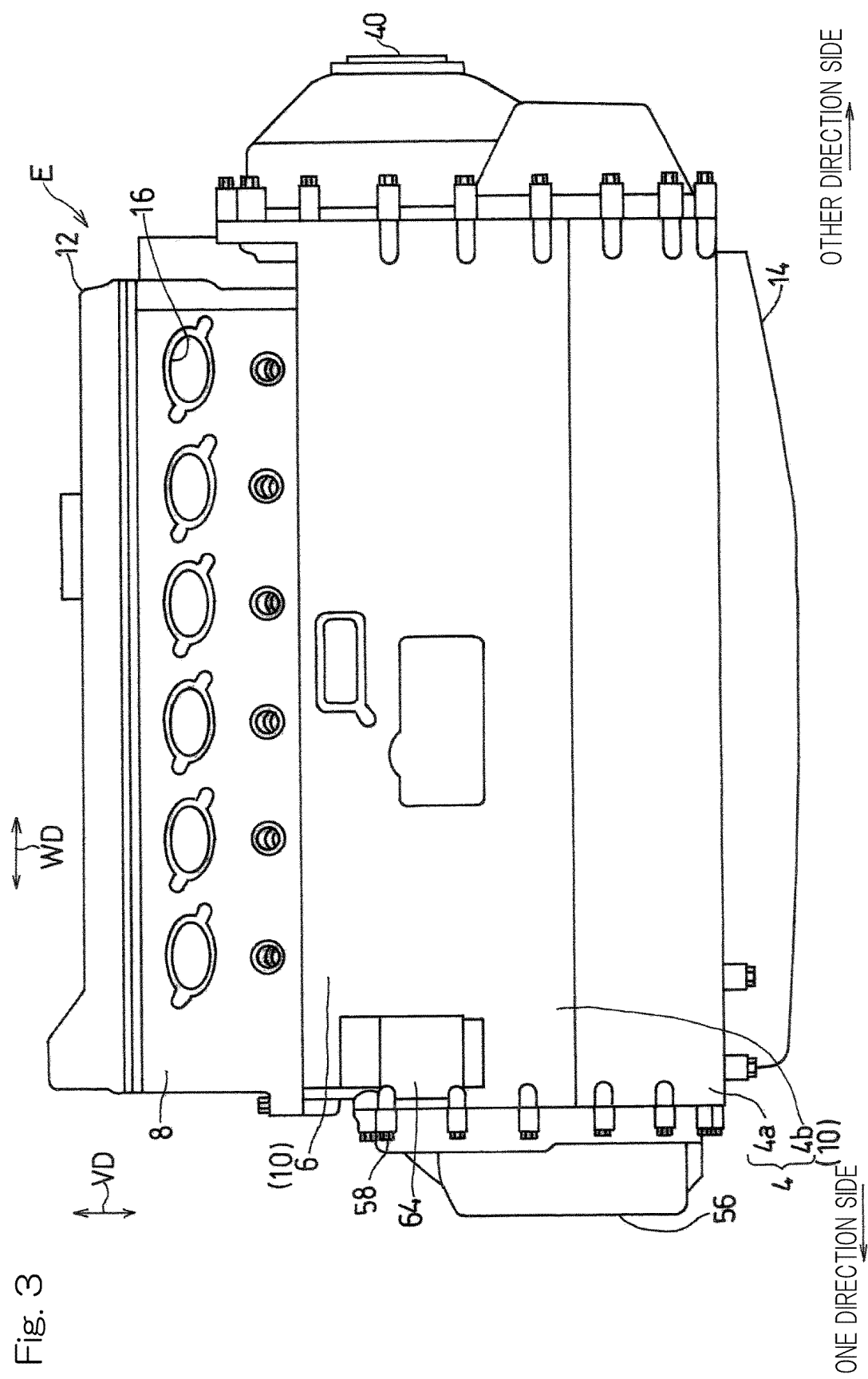
FIG. 3 shows a rear view of the engine.

The valve operation control mechanism 21 is operable to open and close the air intake valve 17 and the exhaust valve 19 in a synchronous manner with the rotary motion of the crankshaft 2. Turning to FIG. 2, the engine E includes a power transmission member 23 which transfers the rotary motion of the crankshaft 2 to the valve operation control mechanism 21. The power transmission member 23 in the instant embodiment comprises a cam chain. It should be understood that a cam chain is only one of the non-limiting examples of the power transmission member 23; for example, the power transmission member 23 can comprise a drive shaft.

The power transmission member 23 (or the cam chain) is disposed in a transmission member housing space CT. The transmission member housing space CT in the instant embodiment comprises a cam chain tunnel CT in which the cam chain 23 is housed. The cam chain tunnel CT is defined by the cylinders 6 and the cylinder head 8 and extends in the reciprocating direction VD. In the instant embodiment, the cam chain tunnel CT is located at one of the opposite ends of the engine E in the widthwise direction WD of the engine. In the discussions that follow, one side of the engine E in the widthwise direction WD of the engine E refers to a side of the engine E in the widthwise direction WD where the cam chain tunnel CT is located, whereas the other side of the engine E in the widthwise direction WD of the engine E refers to a side opposite thereto.

An output shaft 40 and a speed reducer 42 are located on the other side of the engine E in the widthwise direction WD of the engine E. That is, the output shaft 40 and the speed reducer 42 in the instant embodiment are located on a side of the engine E opposite to the cam chain tunnel CT in the widthwise direction WD. The speed reducer 42 reduces a speed of rotational power from the crankshaft 2 before transferring the same to the output shaft 42. The output shaft 40 couples to, for example, a propeller of an aircraft, a wheel of a wheeled vehicle, a rotor of a turbine, or an impeller of a compressor, either directly or via one or more power transmission components.

Figure 4:
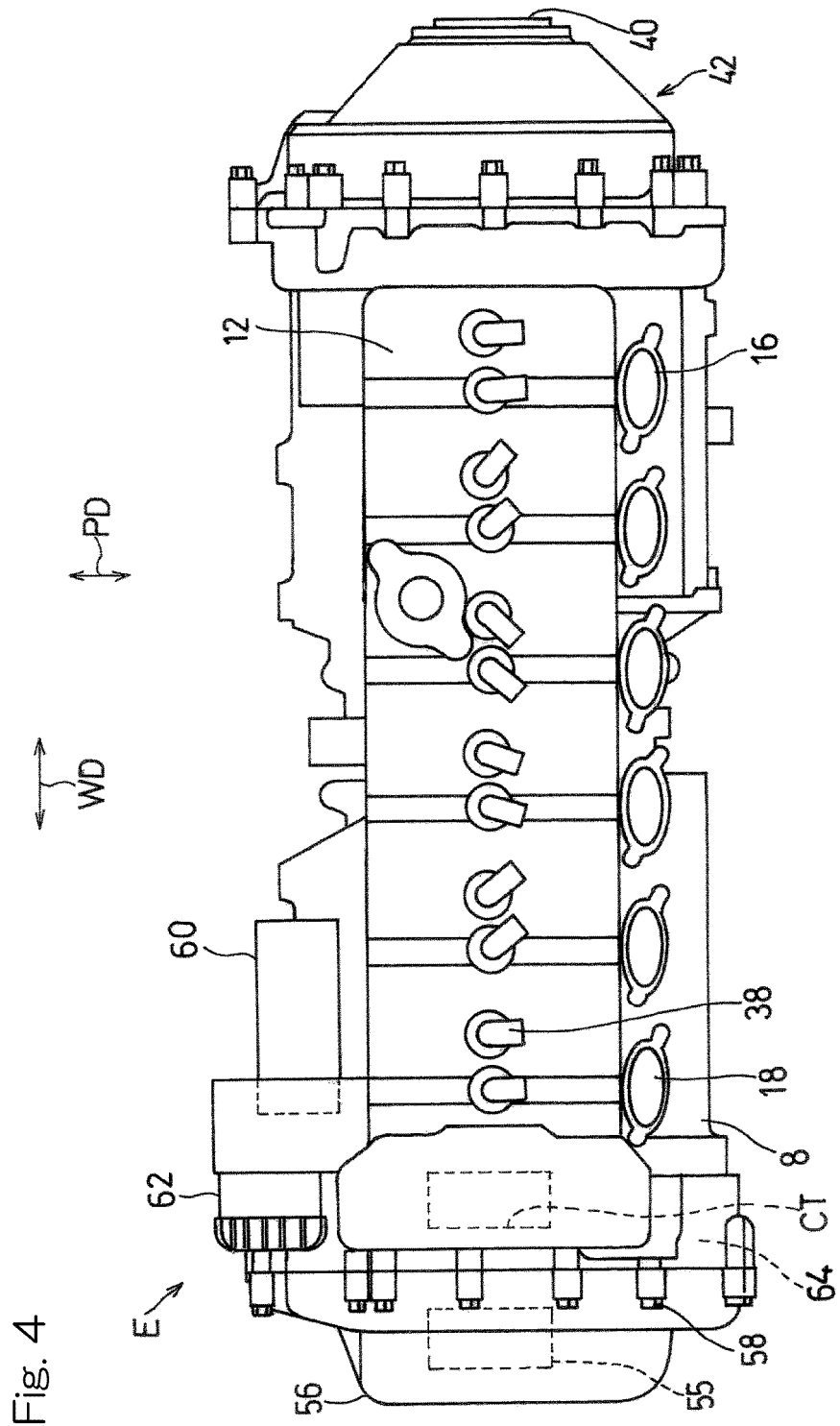
FIG. 4 shows a top view of the engine.

Turning to FIG. 4, the engine E includes a generator 55 arranged on the one side of the engine E in the widthwise direction WD. The generator 55 is mounted to one end of the crankshaft 2. The generator 55 is covered by a generator cover 56 in a circumferential direction and from a widthwise outside. The generator cover 56 is fitted onto the crankcase 4 with a plurality of fasteners 58 such as bolts.

In the illustration of FIG. 5, the generator cover 56 is removed. As illustrated in FIG. 5, a starter motor 60, an oil filter 62, and a pump 64 are arranged on the one side of the engine E in the instant embodiment in the widthwise direction of the engine E. That is, the starter motor 60, the oil filter 62, and the pump 64 are arranged on a side of the engine E on which the transmission member housing space CT is located in the widthwise direction WD. Note that the generator 55 is not shown in FIG. 5.

The starter motor 60 is operable to rotate the crankshaft 2 to initiate an operation of the engine E. In particular, the starter motor 60 includes an output gear 60a which is coupled through a plurality of gears to the crankshaft 2. The starter motor 60 in the instant embodiment comprises a constant mesh starter motor.

The oil filter 62 is operable to filter a lubricant fluid circulating through the engine. In the instant embodiment, engine oil is used as the lubricant fluid. Once the engine E is in operation, the engine oil stored in the oil pan 14 (FIG. 1) is supplied to to-be-lubricated parts of the engine E to lubricate the same. After lubricating those to-be-lubricated parts, the engine oil is filtered through the oil filter 62 before returning to the oil pan 14.

The pump 64 is operable to be interlockingly driven by the rotary motion of the crankshaft 2 to supply a liquid coolant to to-be-cooled parts of the engine E. In the instant embodiment, water is used as the liquid coolant. The pump 64 in the instant embodiment is coupled through a power transmission member 65 such as a chain to the crankshaft 2.

The starter motor 60 is arranged on an exhaust port-side portion of a lower part of the engine E. In the instant embodiment, the starter motor 60 is mounted to an exhaust port-side face of the lower crankcase 4a. The starter motor 60 is positioned to a side of the cylinders 6 that faces the crankcase 4 with respect to the reciprocating direction VD. More specifically, the starter motor 60 is arranged between a mating interface MF2 of the lower crankcase 4a and the upper crankcase 4b and a mating interface MF3 of the lower crankcase 4a and the oil pan 14, with respect to the reciprocating direction VD. Further, an axis 60X of rotation of the starter motor 60 lies on a side of an axis 2a of rotation of the crankshaft 2 which faces away from the cylinder head 8, with respect to the reciprocating direction VD.

The filter 62 is positioned to a side of the starter motor 60 that faces the cylinder head 8. That is, the oil filter 62 is arranged above the starter motor 60. More specifically, the oil filter 62 is arranged above the starter motor 60 such that the oil filter 62 is arranged on an exhaust-port side portion of an upper part of the engine E. The oil filter 62 in the instant embodiment is mounted to an exhaust port-side face of the cylinder block 10. Accordingly, the starter motor 60 and the filter 62 are positioned to a side of the cylinders 6 that faces the exhaust port with respect to the perpendicular direction PD.

Turning to FIG. 2, the oil filter 62 is arranged between a mating interface MF1 of the cylinder block 10 and the cylinder head 8 and the mating interface MF2 of the lower crankcase 4a and the upper crankcase 4b, with respect to the vertical direction VD.

Further, the oil filter 62 is arranged offset from the exhaust port 18 in the widthwise direction when seen in a front elevational view of FIG. 2, that is, when viewed from one side of the engine E in the perpendicular direction. The oil filter 62 in the instant embodiment is arranged displaced externally from the exhaust port 18 in the widthwise direction WD when seen in a front elevational view. This can prevent the oil filter 62 from interfering with an exhaust piping to be connected with the exhaust port 18.

The starter motor 60 and the oil filter 62 extend parallel to the crankshaft 2. In other words, the axis 60X of the starter motor 60 and an axis 62X of the oil filter 62 extend in the widthwise direction WD of the engine E. Since the axis 62X of the oil filter 62 extends in the widthwise direction WD of the engine E and the oil filter 62 is arranged displaced externally from the exhaust port 18 in the widthwise direction WD, the oil filter 62 can be easily attached or detached. In the instant embodiment, the oil filter 62 is attached and detached in directions along which the crankshaft 2 extends. As a result, the oil filter 62 has an improved maintenance-ability.

Turning to FIG. 5, the pump 64 is positioned to a side of the crankshaft 2 that faces the cylinder head 8 (i.e., positioned upwards of the crankshaft 2) with respect to the reciprocating direction VD. The pump 64 in the instant embodiment is arranged on an air intake port-side portion of an upper part of the crankcase 4 of the engine E. Further, the pump 64 is positioned to a side of the cylinders 6 that faces the air intake port when considered in the perpendicular direction PD. The pump 64 in the instant embodiment is arranged at an air intake port-side portion of the interior of the crankcase 4 in the perpendicular direction above the crankshaft 2.

The followings are reasons why the starter motor 60, the oil filter 62, and the pump 64 may be arranged in a manner such as in the instant embodiment: in the discussion, portions of the exhaust port-side of the crankshaft 2 which are located upwards of the crankshaft 2 will be referred to as an "upper exhaust side," portions of the exhaust port-side of the crankshaft 2 which are located downwards of the crankshaft 2 will be referred to as a "lower exhaust side," portions of the air intake port-side of the crankshaft 2 which are located upwards of the crankshaft 2 will be referred to as an "upper air intake side," and portions of the air intake port-side of the crankshaft 2 which are located downwards of the crankshaft 2 will be referred to as a "lower air intake side."

Firstly, the positioning of the pump 64 will be examined. If the pump 64 was arranged on the lower exhaust side or the lower air intake side, the distance between the pump 64 or the cylinders 6 and cylinder head 8 which represent parts to be cooled would increase, thereby resulting in a longer water piping with larger losses in the piping. Further, if the pump 64 was arranged on the upper exhaust side, a water piping therefor would be subjected to the high-temperature heat of the exhaust gas. For these reasons, the pump 64 is arranged on the upper air intake side.

Secondly, the positioning of the starter motor 60 will be examined. If the starter motor 60 was arranged on the upper exhaust side, the starter motor 60 would be subjected to the high-temperature heat of the exhaust gas, which is not desirable. Further, if the starter motor 60 was arranged on the lower air intake side, a mating interface between the crankcase 4 and the generator cover 56 would increase in size in the perpendicular direction PD, resulting in the enlargement of the engine. For these reasons, the starter motor 60 is arranged on the lower exhaust side.

Finally, if the oil filter 62 was on the lower air intake side, the starter motor 60 and the oil filter 62 would be adjacently provided in the perpendicular direction PD on a lower part of the engine E, as the starter motor 60 is arranged on the lower exhaust side, thereby resulting in the enlargement of the engine in the perpendicular direction PD. For this reason, the oil filter 62 is arranged on the upper exhaust side. Since the oil filter 62 withstands heat damage, the oil filter 62 would not cause any problem if arranged on the upper exhaust side which tends to be heated to high temperatures.

By positioning the starter motor 60, the oil filter 62, and the pump 64 in the above described way, it is possible for these accessories 60, 62, 64 to be arranged in a compact configuration to avoid enlargement of the engine E while also protecting the starter motor 60 and the pump 64 against heat damage.

The starter motor 60, the oil filter 62, and the pump 64 shown in FIG. 5 are located on a side of the engine E opposite to the speed reducer 42 and the output shaft 40 in the widthwise direction WD. This keeps them from interfering with an output-side gear provided on the output shaft 40 and relatively large in size, thereby making it possible for the engine E to be further reduced in size.

According to the configuration descried thus far, the starter motor 60 and the filter 62 are arranged spaced apart in the reciprocating direction VD of the pistons. This allows the starter motor 60 and the filter 62 to be arranged in an overlapping manner when viewed in the reciprocating direction VD of the pistons, thereby allowing the engine E to be reduced in size in the axial direction of the crankshaft 2 or in the widthwise direction WD.

Further, the starter motor 60 is positioned to a side of the cylinders 6 that faces the crankcase 4 with respect to the reciprocating direction VD of the pistons, and the filter 62 is positioned to a side of the starter motor 60 that faces the cylinder head 8. This allows the starter motor 60 to be arranged distant from the exhaust port 18 of the engine E. In this way, the starter motor 60 can be kept from being affected by the heat of exhaust gas.

In the instant embodiment, as illustrated in FIG. 2, the starter motor 60 and the filter 62 extend parallel to the crankshaft 2, and the filter 62 is oriented externally in the axial direction of the crankshaft 2 or towards a widthwise outside. According to this configuration, the filter 62 can be replaced from a widthwise outside, thereby resulting in improved attachability and detachability of the filter 62.

In the instant embodiment, the axis 60X of rotation of the starter motor 60 lies on a side of the axis 2a of rotation of the crankshaft 2 which faces away from the cylinder head 8, with respect to the reciprocating direction VD for the pistons. According to this configuration, the starter motor 60 can be arranged distant from the exhaust port 18, thereby preventing the starter motor 60 from being thermally affected.

In the instant embodiment, as illustrated in FIG. 5, the pump 64 which supplies the liquid coolant is positioned to a side of the crankshaft 2 that faces the cylinder head 8 with respect to the reciprocating direction VD of the pistons and is positioned to a side of the cylinders 6 that faces the air intake port with respect to the perpendicular direction PD. According to this configuration, the starter motor 60, the filter 62, and the pump 64 can be arranged on the engine E in a compact configuration, making it possible to avoid enlargement of the engine E. Further, the starter motor 60 and the pump 64 can be protected against heat damage from the exhaust gas.

In the instant embodiment, as illustrated in FIG. 4, the starter motor 60 and the pump 64 are arranged on a side of the engine E on which the power transmission member 23 is located in the widthwise direction WD. According to this configuration, the starter motor 60 and the pump 64 are arranged separated from the combustion chambers 20 by the transmission member housing space CT in which the power transmission member 23 is housed. As a result, it is possible to keep the temperature increase of the starter motor 60 and the pump 64 to a minimum.

In the instant embodiment, as illustrated in FIG. 2, the filter 62 is arranged offset from the exhaust port 18 in the widthwise direction WD when viewed in the perpendicular direction PD. According to this configuration, it is possible to prevent an exhaust piping and the filter 62 from interfering with each other.

In the instant embodiment, as illustrated in FIG. 5, the oil filter 62 is arranged on the exhaust port side in proximity to the combustion chambers 20, the starter motor 60 is arranged on the exhaust port side but spaced downwards from the combustion chambers 20, and the pump 64 is arranged on the air intake port side. This helps keep the temperature increase of the starter motor 60 and the pump 64 to a minimum. The pump 64 is arranged on the air intake port side in the vicinity of the combustion chambers. This helps keep the water supply path to the cylinders 6 short as compared to that when the pump 64 is arranged distant from cylinder chambers.

The above described configurations are only some of the non-limiting configurations of the present disclosure.

Numerous additions, modifications, or omissions can be made therein without departing from the principle of the present disclosure. By way of example, the engine E in the embodiment described thus far can also be applied to saddle-riding vehicles including motorcycles, three-wheeled vehicles, and four-wheel buggies (or all-terrain vehicles). The engine E may be used in outboard motors or used as a propulsion source for an aircraft. In addition, the engine E may be used as a propulsion source for four-wheeled vehicles and small planing boats. The number of the cylinders does not necessarily have to be six and may, instead, be less than six or more than six. The engine E may be provided with a turbocharger, a supercharger, or other similar device(s). Thus, such variants are also encompassed within the scope of the present disclosure.

What is claimed is:

1. An engine comprising:
   a crankshaft which converts a reciprocal motion of a piston to produce a rotary motion;
   a crankcase supporting the crankshaft;
   multiple cylinders extending from the crankcase to protrude in a reciprocating direction of the piston and aligned in an axial direction of the crankshaft;
   multiple cylinder heads, each cylinder head coupled to a protruding end of each of the multiple cylinders;
   a starter motor which rotates the crankshaft to initiate an operation of the engine;
   a filter which filters a lubricant fluid circulating through the engine; and
   an air intake port and an exhaust port defined in one and the other of opposite sides of each of the multiple cylinder heads, respectively, in a direction perpendicular to both a reciprocating direction of the piston and the axial direction of the crankshaft, wherein
   the starter motor and the filter are positioned to a side of each of the multiple cylinders that faces the exhaust port with respect to the perpendicular direction, and
   the starter motor is positioned to a side of each of the multiple cylinders that faces the crankcase, and the filter is positioned to a side of the starter motor that faces each of the multiple cylinder heads, with respect to the reciprocating direction of the piston.

2. The engine as claimed in claim 1, wherein the starter motor and the filter extend parallel to the crankshaft, and the filter is oriented externally in the axial direction of the crankshaft.

3. The engine as claimed in claim 1, wherein an axis of rotation of the starter motor lies on a side of an axis of rotation of the crankshaft which faces away from each of the multiple cylinder heads, with respect to the reciprocating direction of the piston.

4. The engine as claimed in claim 1, further comprising:
   a pump which is interlockingly driven by the rotary motion of the crankshaft to supply a liquid coolant to-be-cooled parts of the engine, wherein
   the pump is positioned to a side of the crankshaft that faces each of the multiple cylinder heads with respect to the reciprocating direction of the piston and is positioned to a side of each of the multiple cylinders that faces the air intake port with respect to the perpendicular direction.

5. The engine as claimed in claim 4, further comprising:
   an air intake valve and an exhaust valve;
   a valve operation control mechanism which exploits power of the crankshaft to operate the air intake and exhaust valves; and a power transmission member which transfers the power of the crankshaft to the valve operation control mechanism, wherein
the starter motor and the pump are arranged on a side of the engine on which the power transmission member is located in the axial direction of the crankshaft.

6. The engine as claimed in claim 1, wherein the filter is arranged offset from the exhaust port in the axial direction of the crankshaft when viewed in the perpendicular direction.

7. The engine as claimed in claim 1, wherein the starter motor and the filter are arranged on a surface, in the perpendicular direction, of the engine in which the exhaust port is formed.

8. The engine as claimed in claim 1, wherein the starter motor and the filter are arranged on an end portion, in the axial direction of the crankshaft, of the engine.

9. The engine as claimed in claim 1, wherein the starter motor and the filter are positioned to a side of the exhaust port that faces the crankcase with respect to the reciprocating direction of the piston.

10. The engine as claimed in claim 1, wherein the filter is positioned to a side of an axis of rotation of the crankshaft that faces each of the multiple cylinder heads with respect to the reciprocating direction of the reciprocating direction of the piston.

11. The engine as claimed in claim 10, wherein the starter motor is positioned to a side of an axis of rotation of the crankshaft that faces the crankcase with respect to the reciprocating direction of the reciprocating direction of the piston.

12. An engine comprising:
a crankshaft which converts a reciprocal motion of a piston to produce a rotary motion;
a crankcase supporting the crankshaft;
a cylinder extending from the crankcase to protrude in a reciprocating direction of the piston;
a cylinder head coupled to a protruding end of the cylinder;
a starter motor which rotates the crankshaft to initiate an operation of the engine;
a filter which filters a lubricant fluid circulating through the engine; and
an air intake port and an exhaust port defined in one and the other of opposite sides of the cylinder head, respectively, in a direction perpendicular to both a reciprocating direction of the piston and an axial direction of the crankshaft, wherein
the starter motor and the filter are positioned to a side of the cylinder that faces the exhaust port with respect to the perpendicular direction,
the starter motor is positioned to a side of the cylinder that faces the crankcase, and the filter is positioned to a side of the starter motor that faces the cylinder head, with respect to the reciprocating direction of the piston, and
the starter motor and the filter are arranged on an end portion, in the axial direction of the crankshaft, of the engine.

13. An engine comprising:
a crankshaft which converts a reciprocal motion of a piston to produce a rotary motion;
a crankcase supporting the crankshaft;
a cylinder extending from the crankcase to protrude in a reciprocating direction of the piston;
a cylinder head coupled to a protruding end of the cylinder;
a starter motor which rotates the crankshaft to initiate an operation of the engine;
a filter which filters a lubricant fluid circulating through the engine; and
an air intake port and an exhaust port defined in one and the other of opposite sides of the cylinder head, respectively, in a direction perpendicular to both a reciprocating direction of the piston and an axial direction of the crankshaft, wherein
the starter motor and the filter are positioned to a side of the cylinder that faces the exhaust port with respect to the perpendicular direction,
the starter motor is positioned to a side of the cylinder that faces the crankcase, and the filter is positioned to a side of the starter motor that faces the cylinder head, with respect to the reciprocating direction of the piston, and
wherein the starter motor and the filter are positioned to a side of the exhaust port that faces the crankcase with respect to the reciprocating direction of the piston.

* * * * *